United States Patent [19]

Close, Jr.

[11] 4,163,137

[45] Jul. 31, 1979

[54] ELECTRICAL BOX SEAL CONSTRUCTION

[76] Inventor: Joseph B. Close, Jr., 3426 Rockwood Dr., Fort Wayne, Ind. 46805

[21] Appl. No.: 926,000

[22] Filed: Jul. 19, 1978

Related U.S. Application Data

[63] Continuation-in-part of Ser. No. 842,685, Oct. 17, 1977, abandoned.

[51] Int. Cl.² .................................................. H01H 9/04
[52] U.S. Cl. ..................................... 200/302; 339/123; 220/242; 220/359
[58] Field of Search .......................... 277/4, 9, 9.5, 166, 277/228, 234, 235 R, 235 A, 235 B; 200/297, 302; 174/53, 66, 67; 220/241, 242, 359, 3.8; 339/36, 40, 123

[56] References Cited

U.S. PATENT DOCUMENTS

| | | | |
|---|---|---|---|
| 3,147,055 | 9/1964 | Rubens | 339/36 |
| 3,201,740 | 8/1965 | Rubens | 220/242 X |
| 3,252,611 | 5/1966 | Weitzman et al. | 220/242 |
| 3,339,228 | 7/1968 | Zerwes | 220/3.8 X |
| 3,780,249 | 12/1973 | Harper | 200/302 |
| 3,875,654 | 4/1975 | Ushijima | 277/153 X |
| 4,072,316 | 2/1978 | Decker et al. | 277/235 B |

FOREIGN PATENT DOCUMENTS

| | | | |
|---|---|---|---|
| 645445 | 7/1962 | Canada | 220/242 |
| 844387 | 4/1939 | France | 200/302 |
| 503504 | 4/1939 | United Kingdom | 200/302 |

*Primary Examiner*—Robert S. Ward, Jr.
*Attorney, Agent, or Firm*—Gust, Irish, Jeffers & Rickert

[57] ABSTRACT

A gasket for sealing around a wall opening to prevent passage of air, the opening having an electrical box therein with an electrical device mounted in the gasket comprising a thin sheet of flexible, air impervious material slightly larger than the wall opening and slightly smaller than the cover plate for the device and having at least one opening therein for receiving a portion of the device which protrudes from the box and through a corresponding opening in the cover plate, the sheet having pressure sensitive adhesive on one side for sealing engagement with the wall surface surrounding the opening therein and with the surface of the device facing the cover plate.

8 Claims, 7 Drawing Figures

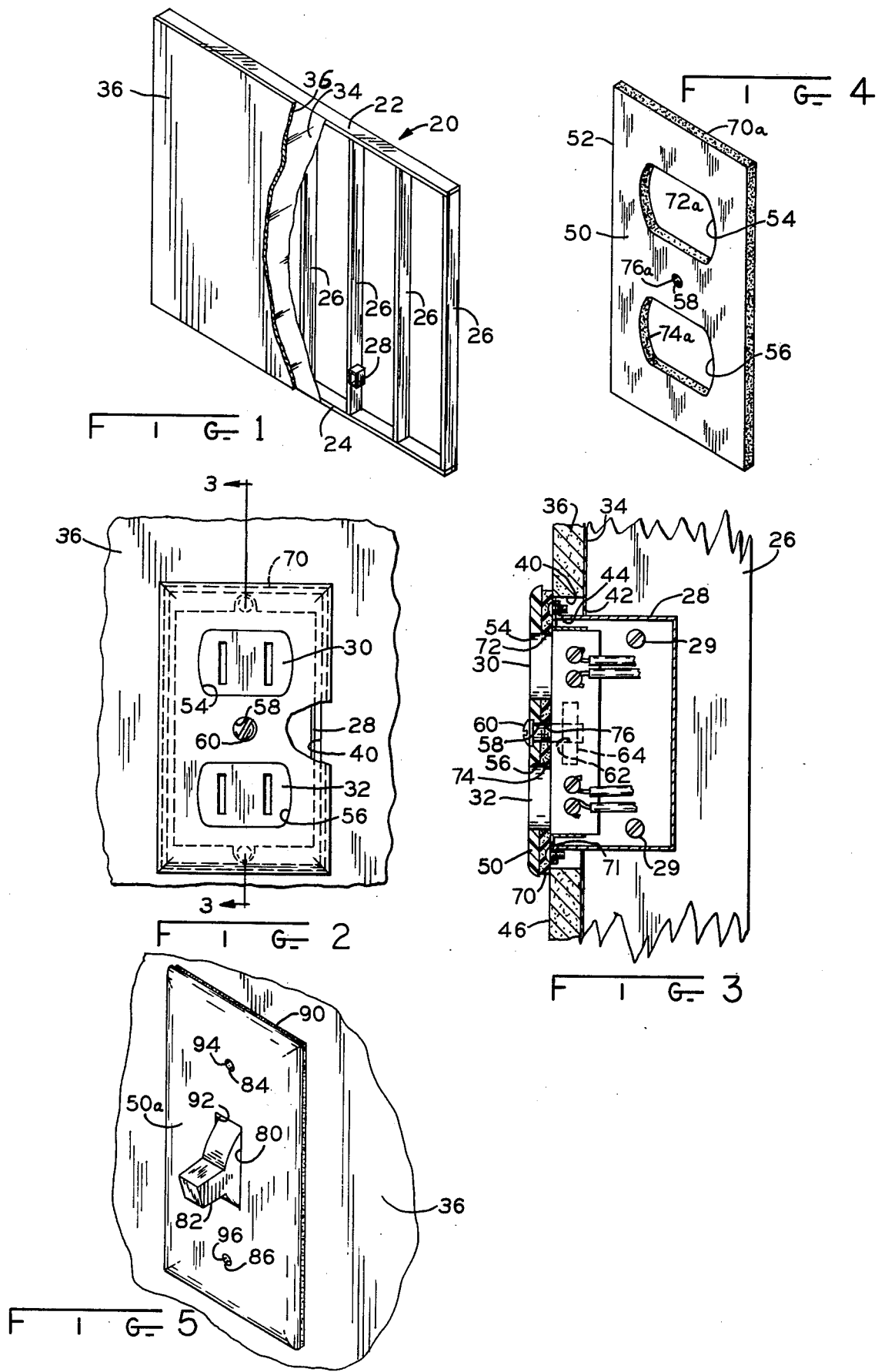

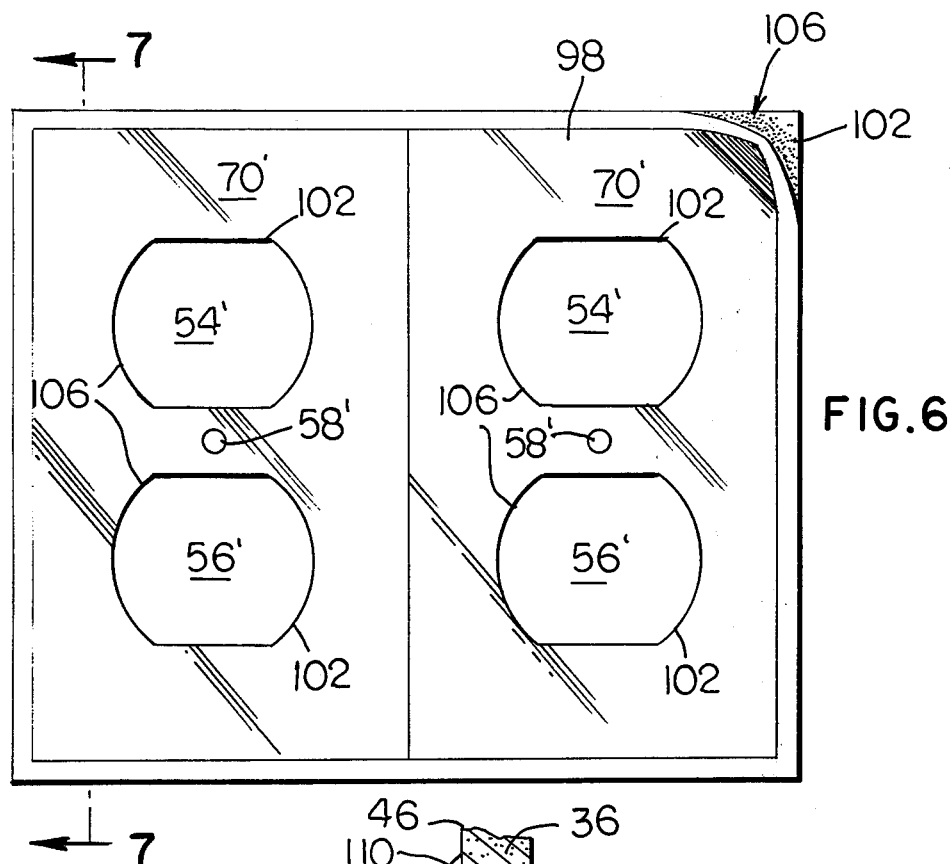
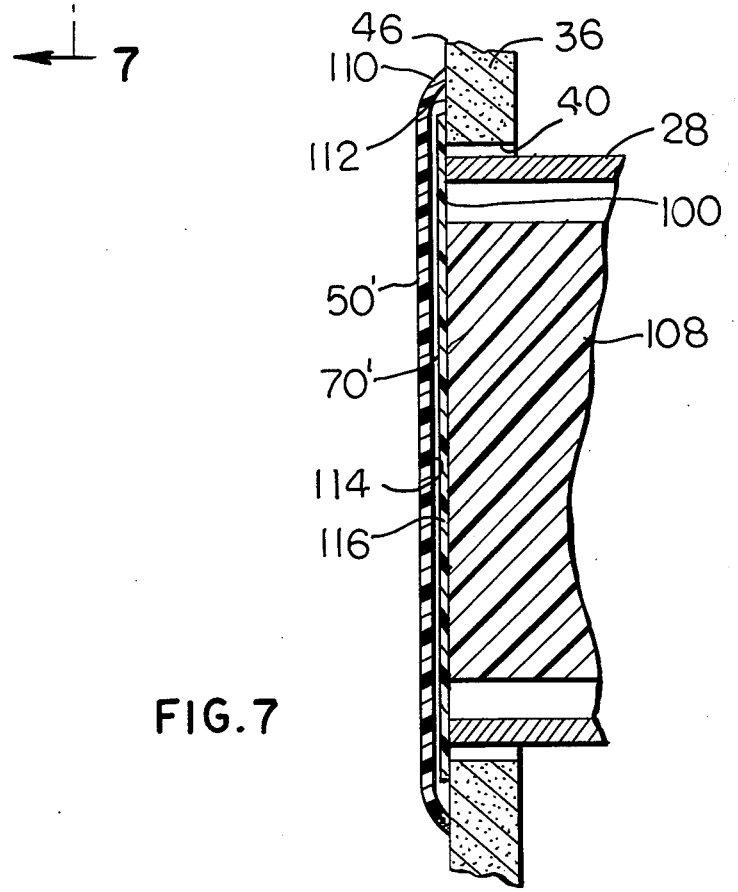

ELECTRICAL BOX SEAL CONSTRUCTION

This application is a Continuation-in-part of my application Ser. No. 842,685, filed Oct. 17, 1977, abandoned.

BACKGROUND OF THE INVENTION

1. Field of the Invention

This invention relates generally to a gasket for sealing around a wall opening having a wall opening therein and an electrical device mounted in the box to prevent the passage of air.

2. Description of the Prior Art

In wall construction for residential, commercial, and other buildings, a wall panel is conventionally attached or affixed to conventional wall studs to provide a wall construction. It is often necessary to place in the wall a number of electrical boxes for supporting electrical receptacles and electrical switches to provide for the normal electrical circuitry building requirements. These boxes typically have an open side which are received by openings formed in the wall panel. The outlet or switch is supported within the receptacle, and a cover plate, which may be decorative, is attached to the open side of the box, with the plate having openings for receiving the switch or receptacle which closely conform to the perimeter of the switch or receptacle. For each box provided, air infiltration occurs through the box and associated panel opening resulting in an undesirable temperature transfer through the wall panel. Various efforts have been made to minimize this transfer, and have generally involved the use of a special cover plate, a gasket in combination with special adaptors, or otherwise special equipment which modifies the appearance and/or adds substantially to the material, installation, and maintenance costs of the box construction, and therefore have found their use in the construction industry both as original and add-on or retrofit equipment restricted.

SUMMARY OF THE INVENTION

A conventional wall construction comprising a plurality of wall studs supported in parallel, transversely spaced relation may be provided on one side with a filmy sheet of impermeable material with a wall panel, such as plasterboard or the like, placed over the sheet and attached to the studs. An air-flow barrier for minimizing temperature transfer from one side of the wall and sheet to the other is thus provided. Also, other thermal insulative materials may be placed between the wall and studding, and/or in the transverse spacing between the studs themselves, as is conventional in the building construction art.

An electrical housing, such as a conventional electrical box, is affixed in the usual manner to one of the studs and has an open side facing the wall panel and barrier sheet. Openings are provided in the panel and sheet, respectively, which closely conform to the outer dimensions of the housing periphery, and a cover plate, which may be decorative, is provided for removable attachment to the housing and over the opening in the wall panel. The box typically holds a wall switch or plug receptacle and contains the electrical connections between the building wiring and the switch or receptacle. The cover plate is provided with an aperture closely conforming to the switch or receptacle periphery. A spongy, compressible, sealing gasket or thin non-compressible but flexible gasket having an outer perimeter substantially coextensive with the box and having apertures therein closely conforming to the cover plate apertures is placed between the cover plate and the box prior to attachment therebetween. The gasket may be vulcanized or otherwise adhered to the cover plate or may have a pressure-adhesive surface which may be placed against the wall panel with the gasket periphery being marginally larger than the opening in the wall panel for adherence to the wall panel in a marginal boundary about the wall panel aperture.

As the cover plate is attached to the housing, the gasket is compressed between the marginal boundary of the wall panel and the cover insuring adherence thereto and sealing therewith. Due to the close fit between the gasket and the electrical switch or receptacle, an effective seal against flow of air is provided. The cover plate may be easily removed and replaced without special repositioning of the gasket, no adaptor for the gasket is necessary, the materials and installation are low in cost, and the seal is highly effective.

In accordance with the preferred embodiment of the invention, a gasket is provided formed of a thin sheet of flexible, air-impervious material slightly larger than the wall opening and slightly smaller than the cover plate, and having at least one opening therein for receiving the portion of the switch or receptacle which protrudes from the box and through a corresponding opening in the cover plate. The sheet has pressure sensitive material on one side for sealing engagement with the wall surface surrounding the opening therein and with the surface of the plug or receptacle which faces the cover plate.

It is therefore an object of this invention to provide an improved air infiltration seal for an electrical box construction having manually accessible electrical devices therein.

A further object of this invention is to provide in such a construction a relatively low cost and highly effective air infiltration seal for electrical boxes mounted in the wall construction.

A still further object of this invention is to provide a sealing member which requires no special adaptor or cover plate and does not interfere with or detract from the decorative appearance of the cover plate.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partially broken away perspective view of a wall construction having an electrical box mounted therein;

FIG. 2 is a front elevational view of a first embodiment of this invention wherein the sealing gasket has a pressure sensitive adhesive on one side thereof;

FIG. 3 is a section taken at 3—3 of FIG. 2;

FIG. 4 is a view in perspective of a typical gasket of this invention;

FIG. 5 is a view in perspective of an embodiment of this invention adapted for a wall switch;

FIG. 6 is a front view of the preferred form of the gasket of the invention; and FIG. 7 is a cross-sectional view showing the gasket of FIG. 6 as installed, taken generally along the line 7—7 of FIG. 6.

DESCRIPTION OF THE PREFERRED EMBODIMENTS

Referring to the drawing, FIG. 1, a wall section 20 is shown having a top plate 22 vertically spaced from a bottom plate 24 with a plurality of vertical, transversely spaced studs 26 affixed therebetween as is conventional in the building art. A conventional metallic electrical box 28 is affixed by means of screws 29 near the lower end of one of the studs 26 and is adapted to support plug receptacles 30, 32 (FIGS. 2 and 3) therein in a conventional manner. A thin, filmy, impermeable sheet 34, which may be of a plastic material commonly used for this purpose in the building industry, is placed against and affixed to one side of wall 20 for providing an air flow barrier and temperature insulation. A wall panel 36, which may be plasterboard or the like, is placed against sheet 34 and affixed to wall 20, again in a manner well known in the building construction art.

Referring now to FIGS. 2 and 3, a first opening 40 is formed in panel 36 and a second opening 42 is formed in sheet 34, with openings 40 and 42 being in registration with one another and but slightly larger than box 28, and closely conforming to the outer perimeter defined by the walls of box 28 which usually protrude into openings 40 and 42. The walls of box 28 define an opening 44 on one side of box 28 which preferably is substantially flush with the side 46 of wall 36. A cover plate 50, which may be decorative and is typically made of a molded plastic, has an outer perimeter which marginally overlaps the wall 36 boundary surrounding the peripheral edges of opening 40. Plate 50 has apertures 54, 56 which closely conform to the outer periphery of receptacles 30 and 32, respectively. Plate 50 has an opening 58 centrally thereof for receiving a screw 60 which is removably and threadedly engageable with threaded bore 62 in a transverse cross member 64 affixed in box 28. Thus, screw 60 removably attaches cover 50 to box 28, with the cover edges abutting against wall 36.

In the embodiment of FIG. 2, a resilient, flat, sheet-like gasket 70, which may be made of sponge plastic material, such as polyurethane, has a pressure sensitive adhesive on side 71 and has apertures 72, 74 which are in registration with and conform closely to apertures 54 and 56, respectively, in plate 50. The outer perimeter of gasket 70 conforms to, and is slightly smaller than, the outer perimeter of plate 50, is marginally larger than opening 40, and overlaps and is sealingly compressed against a marginal boundary of side 46 when cover 50 is attached to box 28. Gasket 70 has an opening 76 in registration with opening 58 and closely seals about the outer circumference of screw 60 to sealingly receive screw 60. Thus, air infiltration through box 28 and wall opening 40 is substantially prevented, and in combination with sheet 34, seals against air infiltration and flow across panel 36 to prevent cool air from flowing into the room.

Upon removal of plate 50 from box 28, bolt 60 is unthreaded from member 64, plate 50 is removed, and gasket 70 may be peeled from side 46 of wall 36. Upon attachment of plate 50 to box 28, gasket 70 is first placed against side 46 so that it adheres to the marginal boundary on wall 46 surrounding opening 40 and then cover 50 is placed over gasket 70, with bolt 60 being inserted through openings 58 and 76 and threadedly engaged in threaded bore 62. Thus, a very simple, easily manufactured, easily maintained, and improved seal construction is provided.

Referring now to FIG. 4, a further embodiment is shown wherein a gasket 70a having openings 72a, 74a and 76a, and similar in material, construction, and dimension to gasket 70, but without the pressure sensitive adhesive backing, is vulcanized or otherwise adhered to plate 50 so that in assembly and disassembly of plate 50 from housing 28, it is unnecessary to peel gasket 70a from wall 36 since it is permanently attached to plate 50.

Referring to FIG. 5, a further embodiment is shown which is adapted to be used with an electrical box which supports and houses a wall switch. A cover plate 50a, having the outer perimeter of similar configuration and dimension to the perimeter of plate 50, has an oblong aperture 80 for receiving a switch arm 82 therethrough and provides clearance for vertical switching movement of arm 82. Openings 84 and 86 are provided in plate 50a to receive screws, not shown, for securing to an electrical box, not shown, but which could be similar in configuration to box 28 and secured to a stud 26 at a vertical position convenient for manual accessibility when the user is in a standing position and located, typically, adjacent a room exit. A gasket 90, which may have a pressure sensitive adhesive on one side thereof for engaging a marginal boundary on wall 46 similar to gasket 70, or which may be vulcanized to plate 50a in a similar manner to gasket 70a, is provided with an aperture 92 which is in registration with and conforms in configuration to opening 80. Gasket 90 has openings 94 and 96 which are in registration with and in conforming configuration to opening 84 and 86 to closely receive threaded attaching screws, not shown. Thus, an air infiltration seal is similarly provided for a wall switch electrical box.

A still further embodiment includes no adhesive on the gasket 70 nor adherence thereof to either the cover plate, wall or electrical fixture. All of the gaskets 70, being formed of sponge rubber or plastic or other spongy, easily compressible material, are conformable to any irregularities on the facing surfaces of the cover plate, wall and electrical fixture in the box 28. Upon installation of the cover plate 50, the gasket 70, 70a in each instance is compressed between the cover plate 50, the surface of wall 36 and the receptacle or switch fixture (of conventional construction), the distortability or compressibility of the gasket thereby permitting it to sealingly engage the various facing surfaces thereby to prevent air infiltration.

Further, the openings in the gasket are sized snugly to receive therethrough those portions of the fixture which are exposed through cover plate 50. This further insures a seal.

A preferred embodiment includes a gasket configured as previously described, of non-foam or non-spongy sheet plastic, such as vinyl, or rubber having a pressure-sensitive adhesive on the side against the panel surface 46. This gasket preferably has release paper on the adhesive side which is peeled off prior to installation as is conventional in the label art. After removal of the release paper, the gasket is fitted over the protruding portion (switch or receptacle) of the electrical device with the peripheral margin adhered to the panel surface in the region surrounding opening 40. By reason of the intimate engagement of the perimeter of the apertures 72, 74, for example, with the outer peripheries of the receptacles 30, 32, respectively, the panel opening 40 is sealed against air infiltration. For a switch, the aperture in the gasket engages the periphery of the base of the switch arm to seal against passage of air. The cover plate is mounted the same as previously described.

Since the conventional switches and receptacles shown are usually formed with rigid plastic housings having surfaces parallel to the cover plate 50 or panel surface 46, the gasket either of compressible or non-compressible foam, as described, can be engaged with or adhered thereagainst for further mounting and sealing. Since the gasket is flexible, it will conform to surface irregularities on panel 36 as well as on the electrical device, thereby providing area engagement which precludes air passage.

Referring more particularly to FIGS. 6 and 7, in which like elements are indicated by like reference numerals and similar elements by primed reference numerals, in the preferred embodiment of the invention, two or more gaskets 70' may be formed from a single sheet 98 of thin, flexible, air-impervious material having pressure sensitive adhesive on one side 100, sheet 98 being initially adhered to release paper 102 in conventional fashion. Gaskets 70' are outlined by serration lines 104 and may be peeled from release paper 102 as indicated at 106 in FIG. 6. Serration lines 106 outline push-out portions 54', 56' which, after separation of gaskets 70' from release paper 102, are pushed out to define openings for receiving receptacles 30, 32. Push-out portions 58' accommodate screws 60 (FIGS. 2 and 3) which attach cover plate 50' to electrical device 108 (receptacle or switch) in box 28.

As seen in FIG. 7, cover plate 50' has edge 110 which engages surface 46 of wall 36 and defines peripheral surface 112 with wall opening 40. Edge 110 defines a slight recess 114 in cover plate 50' which faces box 28. Gasket 70' is larger than wall opening 40 and smaller than cover plate 50'. Thus, adhesive side 100 of gasket 70' is adhered to peripheral area 112 of surface 46 of wall 36 around opening 40, and is concealed by cover plate 50'. Gasket 70' is also adhered to surface 116 of electrical device 108 so as totally to seal opening 40 against the passage of air.

Sheet 98 is preferably formed of suitable plastic material having fire retardant properties, such as a vinyl. Material sold by Avery Products Corp. under the trademark Fasson is suitable for sheet 98 and release paper 102.

This invention can also be used to cover and seal the openings in ceiling panels, which receive electrical fixtures such as hanging lamps. In this instance, the gasket is formed to a size as will adhesively overlap the marginal edges of the ceiling panel about the opening and with a suitable aperture sealingly to receive that part of the fixture which projects beyond the ceiling surface. Thus the ceiling opening is sealed against air passage.

While there have been described above the principles of this invention in connection with specific apparatus, it is to be clearly understood that this description is made only by way of example and not as a limitation to the scope of the invention.

What is claimed is:

1. In the combination of a wall having an opening therein and having an outer surface, an electrical box mounted in said opening, an electrical device mounted in said box and having a surface generally flush with said wall opening and at least one portion protruding outwardly from said surface thereof and beyond said box and wall surface, a cover plate having a peripheral edge defining a shallow recess, and means for securing said cover plate to said device with said recess facing said box and with said edge engaging said wall surface surrounding said opening and defining a peripheral area therewith, said cover plate having at least one opening therein for receiving said portion of said device, the improvement comprising: a gasket for sealing around said opening and said device to prevent passage of air, said gasket comprising a thin sheet of flexible, air-impervious, material larger than said wall opening and smaller than said cover plate and having at least one opening therein for receiving said protruding portion of said device, said sheet having pressure sensitive adhesive on one side thereof and being adhered to said peripheral area of said wall and to at least a part of said surface of said device.

2. The combination of claim 1 wherein said sheet is formed of plastic material having flame retardent properties.

3. The combination of claim 2 wherein said material is a vinyl.

4. A gasket for sealing around a wall opening having an electrical box mounted therein and an electrical device in said box with a cover plate attached to said device and engaging said wall, said gasket comprising a thin sheet of flexible, air-impervious, material larger than said wall opening and smaller than said cover plate and having at least one opening therein for receiving a protruding portion of said device, said sheet having pressure sensitive adhesive on one side thereof for adherence to the peripheral area of said wall around said opening and at least a part of a surface of said device.

5. The gasket of claim 4 wherein said sheet has serrations formed therein outlining a push-out portion which defines said opening therein.

6. The gasket of claim 5 wherein said adhesive side of said sheet is adhered to release paper.

7. The gasket of claim 6 wherein said sheet is formed of plastic material having flame retardant properties.

8. The gasket of claim 7 wherein said material is a vinyl.